United States Patent [19]
Mori et al.

[11] Patent Number: 5,199,170
[45] Date of Patent: Apr. 6, 1993

[54] MANUFACTURING METHOD OF HALF-SPLIT BEARINGS

[75] Inventors: Sanae Mori, Nagoya; Takayosi Sasaki, Tajimi; Noriyoshi Ito, Aichi, all of Japan

[73] Assignee: Daido Metal Company Ltd., Nagoya, Japan

[21] Appl. No.: 888,391

[22] Filed: May 4, 1992

Related U.S. Application Data

[63] Continuation of Ser. No. 641,311, Dec. 12, 1990, abandoned, which is a continuation of Ser. No. 483,021, Feb. 20, 1990, abandoned, which is a continuation of Ser. No. 328,269, Mar. 24, 1989, abandoned.

[30] Foreign Application Priority Data

Apr. 7, 1988 [JP] Japan ................................. 63-85983

[51] Int. Cl.$^5$ ............................................. B21D 53/10
[52] U.S. Cl. ................................. 29/898; 29/898.057
[58] Field of Search ...................... 72/414, 415, 398; 29/898.056, 898.057, 898.058, 898; 384/125, 215, 272, 273, 624

[56] References Cited

U.S. PATENT DOCUMENTS

| | | | |
|---|---|---|---|
| 625,789 | 5/1899 | Macbeth | 72/313 |
| 1,906,273 | 5/1933 | Klocke | 29/898.058 |
| 1,924,230 | 8/1933 | Davis | 29/898.057 |
| 3,455,004 | 7/1969 | Tethal | 29/149.5 C |
| 3,863,485 | 2/1975 | MacDonald | 72/345 |
| 4,180,895 | 1/1980 | Spikes et al. | 29/898.056 |

FOREIGN PATENT DOCUMENTS

| | | | |
|---|---|---|---|
| 2740469 | 3/1978 | Fed. Rep. of Germany | 29/149.5 DP |
| 663476 | 12/1951 | United Kingdom | 29/898.057 |

*Primary Examiner*—Joseph M. Gorski
*Attorney, Agent, or Firm*—Browdy and Neimark

[57] ABSTRACT

This invention pertains to a method of manufacturing a half-split bearing, comprising the steps of: providing a blank having a width corresponding to a width of a final said half split bearing: first bending opposite ends of the blank by a first punch and die set while restraining a central portion of the blank in a wall-thickness wise direction, the restraining produced by clamping the blank between a restrainer located centrally on the punch of the first punch and die set and the die of said set, thereby forming a partially processed bent blank having first bending; further, bending in a second stage said partially processed bent blank by a second punch and die set beginning at points between the first bendings and said restrained a central portion while continuing to restrain restraining the central portion of the partially processed bent blank in the wall-thickness wise direction, the restraining produced by clamping the partially processed bent blank between a restrainer located centrally on the punch of the second punch and die set and the die of the set, said bending in a second stage forming to form a substantially half-circular blank; reducing a circumferential length of the substantially half-circular blank while restraining the substantially half circular blank in the wall-thickness wise, widthwise and circumferential directions between a third punch and die set, thereby forming a half-split bearing of a predetermined size.

5 Claims, 4 Drawing Sheets

5,199,170

MANUFACTURING METHOD OF HALF-SPLIT BEARINGS

This application is a continuation of U.S. application Ser. No. 641,311, filed Dec, 12, 1990, and now abandoned, which is a continuation of U.S. application Ser. No. 483,021, filed Feb. 20, 1990 and now abandoned, which is a continuation in part of U.S. application Ser. No. 328,269, filed Mar. 24, 1989, and now abandoned.

FIELD OF THE INVENTION

The present invention relates to a method of manufacturing half-split bearings.

BACKGROUND OF THE INVENTION

A method of manufacturing half-split bearings is conventionally known from Japanese Patent Publication No. 56- 41342. In the known method, an elongated strip that is material of the half-split bearing is fed into a press in a stepwise manner longitudinally of the strip. The press is actuated each time the strip makes a step forward, to successively cut the strip widthwise into a plurality of blanks different from each other. These blanks are pressed to manufacture half-split outer bearing plates.

The above known method has the following problems:

1) A strip-like plate to be fed into the press is required to be cut into a length substantially equal to a peripheral length of half-split bearing. Alternatively, the strip-like plate is required to be cut within the press. By this reason, there occurs abatement or chips. Thus, the yield is low.

2) Contiguous blanks chamfered by embossing are cut along V-shaped grooves, each pair of which are opposed to each other. Accordingly, each cut surface is brought to a configuration accompanied with a broken surface. This is inferior in appearance. Further, when a half-split bearing formed from the blank is assembled into an engine, there is a fear that fine or minute particles fall from the cut surface.

3) The process in which each cut blank is forced into a half-cylindrical coining die by a bending punch relies only upon friction of a minute surface of the cut blank which is brought into contact with the half-cylindrical coining die. Therefore, there is a fear that the blank shifts due to unbalance of friction.

4) In the aforesaid process, the blank tends to be lifted from the top of the bending punch when the bending processing proceeds to the middle, so that the blank is brought to a radius smaller than that of the bending punch. The forming proceeds as it is, and the blank is again brought to a configuration identical with that of the bending punch. Thus, undue force is applied to the bearing alloy.

Another prior art process is illustrated by FIGS. 6-12. In FIG. 6 it is seen that blank 45 is restrained in a width-wise direction by die 42, but the blank is not restrained at its central portion in a wall-thickness-wise direction. Thus, as shown in FIG. 7, when bend punch carrier 43 forces the bend punch 44 to reshape the blank 45, the blank becomes excessively bent because the central portion of the blank 45 is not restrained in the wall thickness wise direction, and this will often produce a crack or cracks in the bent blank 45. Also, a gap 46 will often be produced between the bend punch and the bent blank 45 as shown in FIG. 8.

The prior art process is continued in FIG. 9 with the bend punch 44 forcing the blank 45 into the die 42 to complete shaping of the blank, this step also often producing a crack or cracks in the blank. The prior art process is complete as shown in FIGS. 10 and 11 with the lifting of the bend punch carrier 43 and the removal of the finished product 45 from the bend punch 44 by means of the fingers 41. This prior art process often leaves the produce with undesirable cracks in its central position.

SUMMARY OF THE INVENTION

It is an object of the invention to provide a method of manufacturing a half-split bearing, which is capable of solving the above-discussed problems of the prior art.

To this end, according to the invention, there is provided a method of manufacturing a half-split bearing from a strip-like plate, comprising the steps of:
a) carrying out processing of opposite side faces of a wide strip-like plate and chamfering thereof, to continuously machine the strip-like plate into a strip-like plate having a width corresponding to a width of an objective half-split bearing;
b) cutting the machined strip-like plate into a length corresponding to that of the objective half-split bearing to form a blank, and bending opposite ends of the blank while restraining the same in a wall-thicknesswise direction;
c) further bending the bent blank into a half-circular configuration substantially corresponding to a final configuration of the half-split bearing, while restraining the blank in the wall-thicknesswise direction;
d) reducing a length of the half-circular blank while restraining inner and outer peripheral surfaces of the half-circular blank and, further, forming the half-circular blank while restraining the same widthwise; and
e) subjecting a formed article to oil-hole processing and notch processing.

According to the invention, there is also provided a method of manufacturing a half-split bearing from a strip-like plate, comprising the steps of:
a) carrying out at least one of processing of opposite side faces of a wide strip-like plate and chamfering thereof, to continuously machine the strip-like plate into a strip-like plate having a width corresponding to a width of an objective half-split bearing:
b) cutting the machined strip-like plate into a length corresponding to that of the objective half-split bearing to form a blank, and bending opposite ends of the blank while restraining the same in a wall-thicknesswise direction;
c) further bending the bent blank into a half-circular configuration substantially corresponding to a final configuration of the half-split bearing, while restraining the blank in the wall-thicknesswise direction;
d) reducing a length of the half-circular blank while restraining inner and outer peripheral surfaces of the half-circular blank and, further, forming the half-circular blank while restraining the same widthwise; and
e) subjecting a formed article to at least one of oil-hole processing, notch processing and oil-groove processing.

Further, according to the invention, there is provided a method of manufacturing a half-split bearing from a strip-like plate, comprising the steps of:
a) subjecting a wide strip-like plate to at least one of width processing, chamfering, oil-grooved processing, oil-hole processing, wall-thickness processing, embossing, and mark-applying processing, to continuously machine the strip-like plate into a strip-like plate having a width corresponding to a width of an objective half-split bearing;

b) cutting the machined strip-like plate into a length corresponding to that of the objective half-split bearing to form a blank, and bending opposite ends of the blank while restraining the same in a wall-thicknesswise direction;

c) further bending the bent blank into a half-circular configuration substantially corresponding to a final configuration of the half-split bearing, while restraining the blank in the wall-thicknesswise direction; and d) reducing a length of the half-circular blank while restraining inner and outer peripheral surfaces of the half-circular blank and, further, forming the half-circular blank while restraining the same widthwise.

DESCRIPTION OF THE PREFERRED EMBODIMENTS

Figure 1:
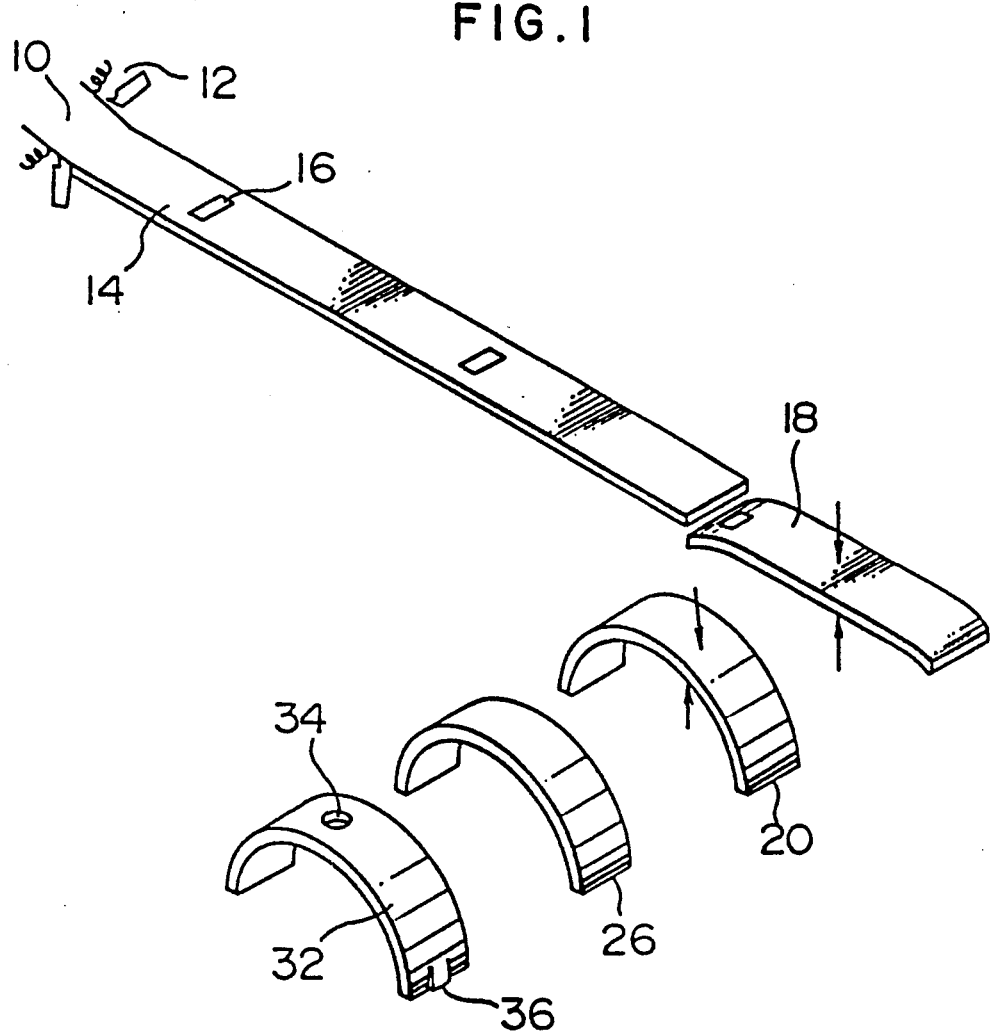
FIG. 1 is a view of explanation of a series of steps of a method of manufacturing a half-split bearing according to the invention.

Referring to FIG. 1, there is shown a method of manufacturing a half-split bearing according to the invention. In a first step of the method, a strip-like plate 10 having a certain width is machined continuously by a cutting tool 12. Specifically, both side faces of the strip-like plate 10 are continuously worked by the cutting tool 12. Inner and outer surfaces of the strip-like plate 10 are also continuously chamfered by the cutting tool 12, correspondingly to chamfering of inner and outer peripheral surfaces of a half-split bearing. Thus, the strip-like plate 10 is formed into a strip-like plate 14 which has a reduced width required for the half-split bearing. At this time, it is preferable that an amount of widthwise cutting is of the order of 0.05 mm to 0.1 mm on one side.

In a second step, a mark 16 such as a trademark, a part number and so on is applied to the surface of the strip-like plate 14, which is brought to the outer peripheral surface of the half-split bearing.

Figure 3:
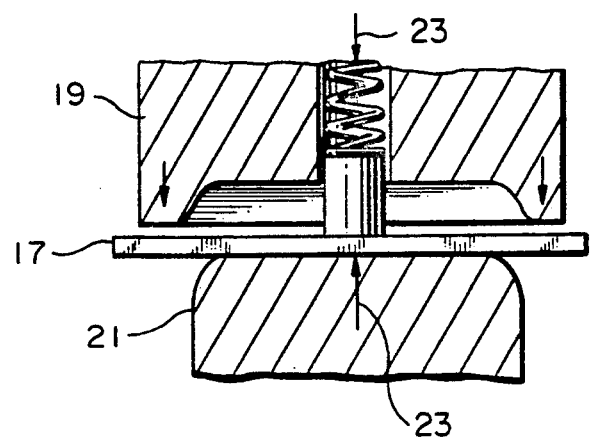
FIG. 3 is a side cut-away view of another forming device which can be used in accordance with the present invention.
Figure 3A:
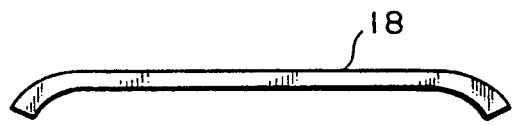
FIG. 3A is a side view of the partially processed bearing produced by the forming device of FIG. 3.

In a third step, the strip-like plate 14 is cut into a length corresponding substantially to the peripheral length of the half-split bearing, to form a blank 17 as shown in FIG. 3. The opposite ends of blank 17 are bent with high accuracy by means of punch 19 and die 21, while the central position of blank 17 is restrained in the wall thickness wise direction by restrainer 123 and die 21 during the cutting and bending, to produce a partially processed bent blank 18.

Figure 4:
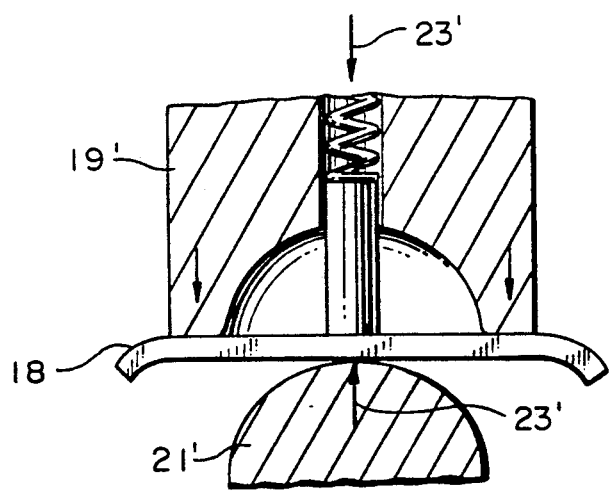
FIG 4 is a side cut-away view of another forming device which can be used in accordance with the present invention.
Figure 4A:
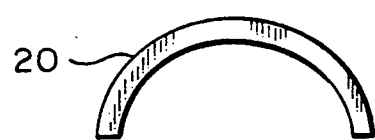
FIG. 4A is a side view of the substantially processed bearing produced by the forming device of FIG. 4.

In a fourth step illustrated in FIG. 4, the semi-processed article 18 is bent into a semi-product 20 in the form of a final half-circular configuration substantially corresponding to a final configuration of the half-split bearing, by means of a die 21' and a punch 19'. At this time, the semi-product 18 is restrained in the wall-thicknesswise direction by restrainer 23' in a manner like the third step.

Figure 2:
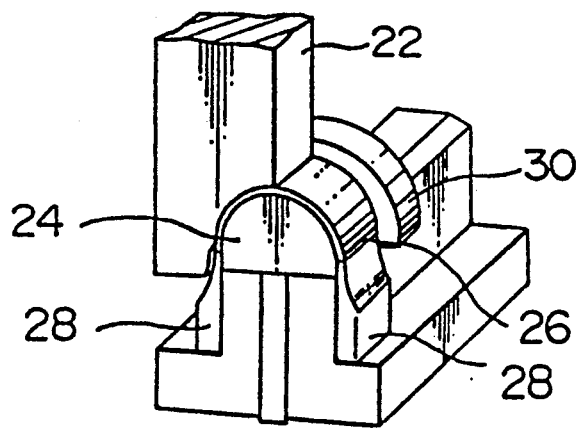
FIG. 2 is a perspective view of a forming device.
Figure 5:
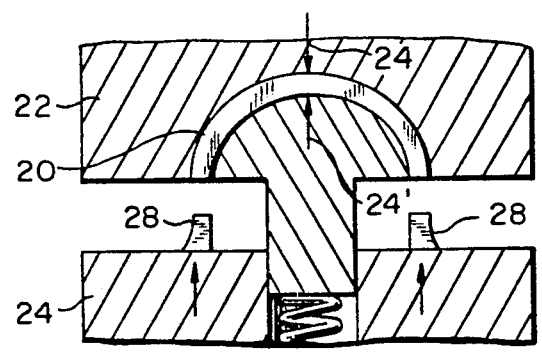
FIG. 5 is a side cut-away view of a forming device similar to the device shown in FIG. 2.
Figure 5A:
FIG. 5A is a side view of the finished bearing produced by the forming device of FIG. 5.
Figure 6:
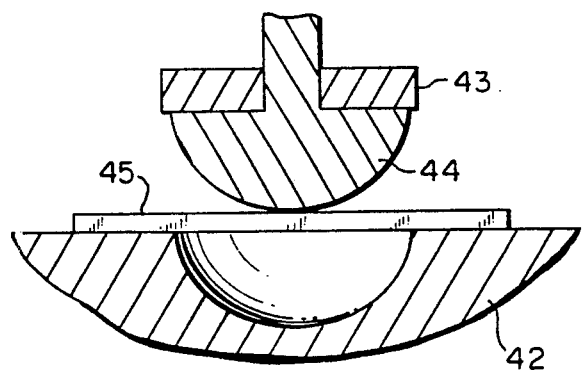
FIGS. 6-11 show a side view of a prior art forming device at various steps in the prior art process.
Figure 7:
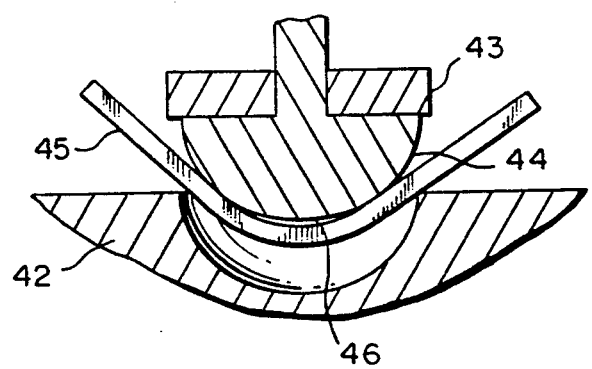
Figure 8:
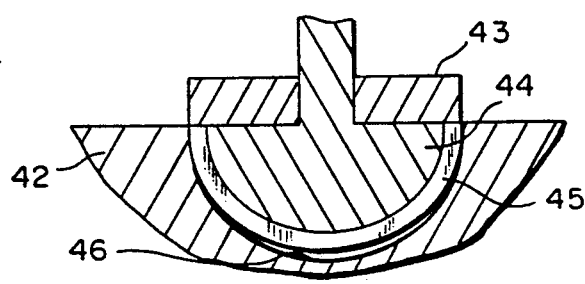
Figure 9:
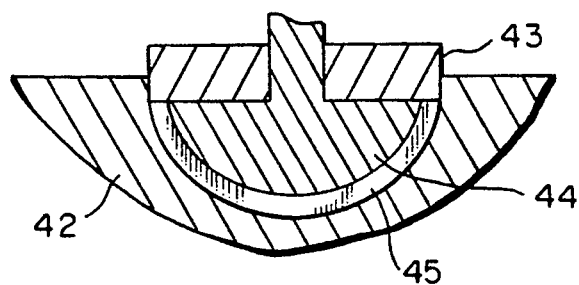
Figure 10:
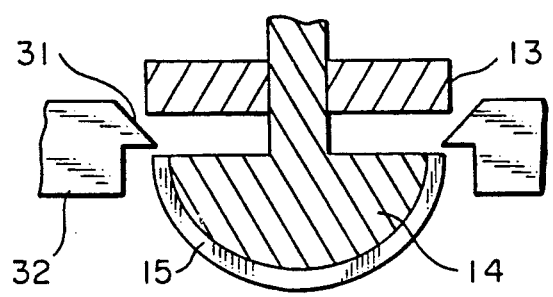
Figure 11:
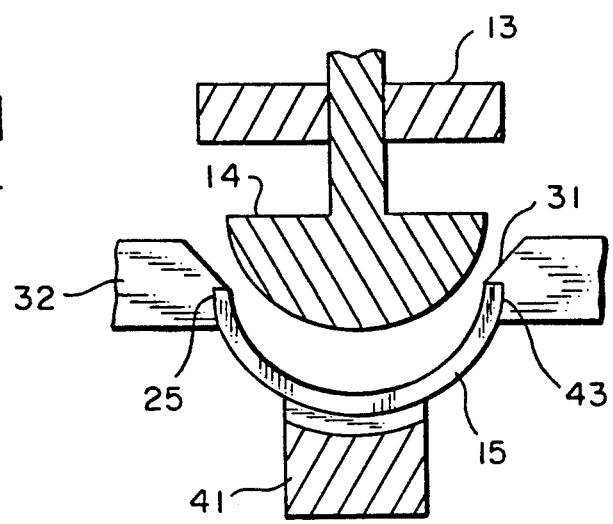

In the fifth step, the half-circular semi-product 20 is pressed down while being restrained, by a highly accurate coining die and forming punch 22 and 24 as shown in FIGS. 2 and 5. The semi-product 20 is reduced in cylindrical length by blocks 28 shown in FIG. 2, thereby obtaining a highly accurate half-split bearing 26. As shown in FIG. 5, the opposite projections of blocks 28 press the end surfaces of the blank 20, reducing the circumferential length of the blank to provide a true semi-circular shape 26. At the pressed-down position, there are provided side plates 30 (only one of which is shown in FIG. 2) which restrain the semi-product 26 widthwise. By the side plate 30, the material reduced in cylindrical length by the blocks 28 is corrected or reformed in widthwise movement. Thus, the internal pressure of the material is raised, so that the highly accurate half-split bearing can be manufactured.

In the sixth step, an oil hole 34 and a notch 36 are formed in the thus formed half-split bearing product 32.

In connection with the above-described third step, the cutting and the bending of the opposite peripheral ends of the blank may be separated into steps different from each other. Further, the oil hole 34 and the notch 36 may beforehand be formed in the state of the strip-like plate and, moreover, the embossing and the wall-thickness processing may also beforehand be carried out in the state of the strip-like plate. Furthermore, if an oil groove or the like is required depending upon the use of the bearing, a new step of forming the oil groove or the like may be prepared in the state of the strip-like plate or after the bending.

The half-split bearing according to the invention has the following advantages:

1) Since no abatement is produced at cutting with respect to the peripheral length of the half-split bearing, the yield of the strip-like plate is high.

2) Since the processing of the side faces of the strip-like plate and the chamfering thereof are carried out by machining or cutting, the appearance is good. Further, since the half-split bearing has no broken surface, fine or minute particles do not fall from the broken surface when the half-split bearing is assembled into an engine so that there is provided a clean interior of the engine. Moreover, since the machining or cutting is effected continuously, the service life of the tools can be prolonged.

3) At the stage of the blank, the opposite peripheral ends of the blank are bent beforehand, whereby the blank can be formed into a half-circular shape without difficulty. In this connection, the roundness and the straightness in the vicinity of the opposite ends of the half-circular can be improved.

4) In bending into a half-circular shape, the blank is restrained in the wall-thicknesswise direction, whereby the blank is always in contact with the bending punch. thus, no undue stress occurs in the bearing alloy.

The foregoing description of the specific embodiments will so fully review the general nature of the invention that others can, by applying current knowledge, readily modify and/or adapt for various applications such specific embodiments without departing from the generic concept, and, therefore, such adaptations and modifications should and are intended to be comprehended within the meaning of range of equivalents of the disclosed embodiments. It is to be understood that the phraseology or terminology employed herein is for the purpose of description and not of limitation.

What is claimed is:

1. A method of manufacturing a half-split bearing, comprising the steps of:
    providing a blank having a width corresponding to a width of a final said half split bearing;
    first bending opposite ends of said blank by a first punch and die set while restraining a central portion of said blank in a wall-thickness wise direction, said restraining produced by clamping said blank between a restrainer located centrally on the punch of said first punch and die set and the die of said set, thereby forming a partially processed bent blank having first bendings;
    further, bending in a second stage said partially processed bent blank by a second punch and die set beginning at points between said first bendings and a central portion while restraining said central portion of said partially processed bent blank in the wall-thickness wise direction, said restraining produced by clamping said partially processed bent blank between a restrainer located centrally on the punch of said second punch and die set and the die of said set, said bending in a second stage forming a substantially half-circular blank;
    reducing a circumferential length of said substantially half-circular blank while restraining said substantially half-circular blank in the wall-thickness wise, widthwise and circumferential directions between a third punch and die set, thereby forming a half-split bearing of a predetermined size.

2. The method as set forth in claim 1, further comprising subjecting said half-split bearing to at least one of the additional steps of oil-hole forming and notch forming.

3. The method of manufacturing a half-split bearing of claim 1, wherein
    said restraining of said substantially half-circular blank in the wall-thickness wise direction is produced by clamping said half-circular blank between a restrainer located centrally on the punch of said third punch and die set and the die of said set;
    said die of said third punch and die set having a circumference corresponding to the outer circumference of said substantially half-circular blank,
    said restrainer having a circumference corresponding to an inner circumference of said substantially half-circular blank;
    said punch of said third punch and die set having projections which reduce said circumferential length of said substantially half-circular blank when said punch is actuated to cooperate with said die of said third punch and die set.

4. The method of manufacturing a half-split bearing of claim 3, wherein
    restraining said substantially half-circular blank in the widthwise direction is produced by side plates cooperating with said third punch and die set and adjacent to side edges of said substantially half-circular blank.

5. The method of manufacturing a half-split bearing of claim 3, wherein
    said punch and said die of said second punch and die set have corresponding substantially half-circular surfaces which result in forming said substantially half-circular blank.

* * * * *